United States Patent [19]

Sandmann

[11] Patent Number: 4,506,706
[45] Date of Patent: Mar. 26, 1985

[54] EXPANSION BULB FOR PLUGGING A CONDUIT OR PASSAGE

[76] Inventor: Dennis E. Sandmann, 301 N. Hamilton Dr., Buchanan, Mich. 49107

[21] Appl. No.: 498,057

[22] Filed: May 25, 1983

[51] Int. Cl.³ ............................................. F16L 55/12
[52] U.S. Cl. ..................................................... 138/93
[58] Field of Search ................... 138/90, 93; 220/222, 220/225, 232; 277/34; 166/122, 135, 184, 192, 212

[56] References Cited

U.S. PATENT DOCUMENTS

| | | | |
|---|---|---|---|
| 1,549,168 | 8/1925 | Townsend | 277/34 X |
| 2,399,125 | 4/1946 | Lehnhard, Jr. | 166/184 X |
| 3,870,085 | 3/1975 | Schneider | 138/93 |
| 4,413,653 | 11/1983 | Carter, Jr. | 277/34 X |

FOREIGN PATENT DOCUMENTS

| | | | |
|---|---|---|---|
| 313634 | 6/1956 | Switzerland | 138/90 |
| 22591 | of 1898 | United Kingdom | 138/93 |

Primary Examiner—Stephen Marcus
Assistant Examiner—Mark Thronson
Attorney, Agent, or Firm—Eugene C. Knoblock

[57] ABSTRACT

An expansion bulb for plugging a conduit or passage which includes an expandable sleeve encircling a body and secured to the body by caps securing opposite ends of the sleeve to the body with each end of the sleeves extending into recesses in the body. Pressurized air or fluid is supplied through a passage in the body to cause radial expansion of the sleeve relative to the body.

5 Claims, 4 Drawing Figures

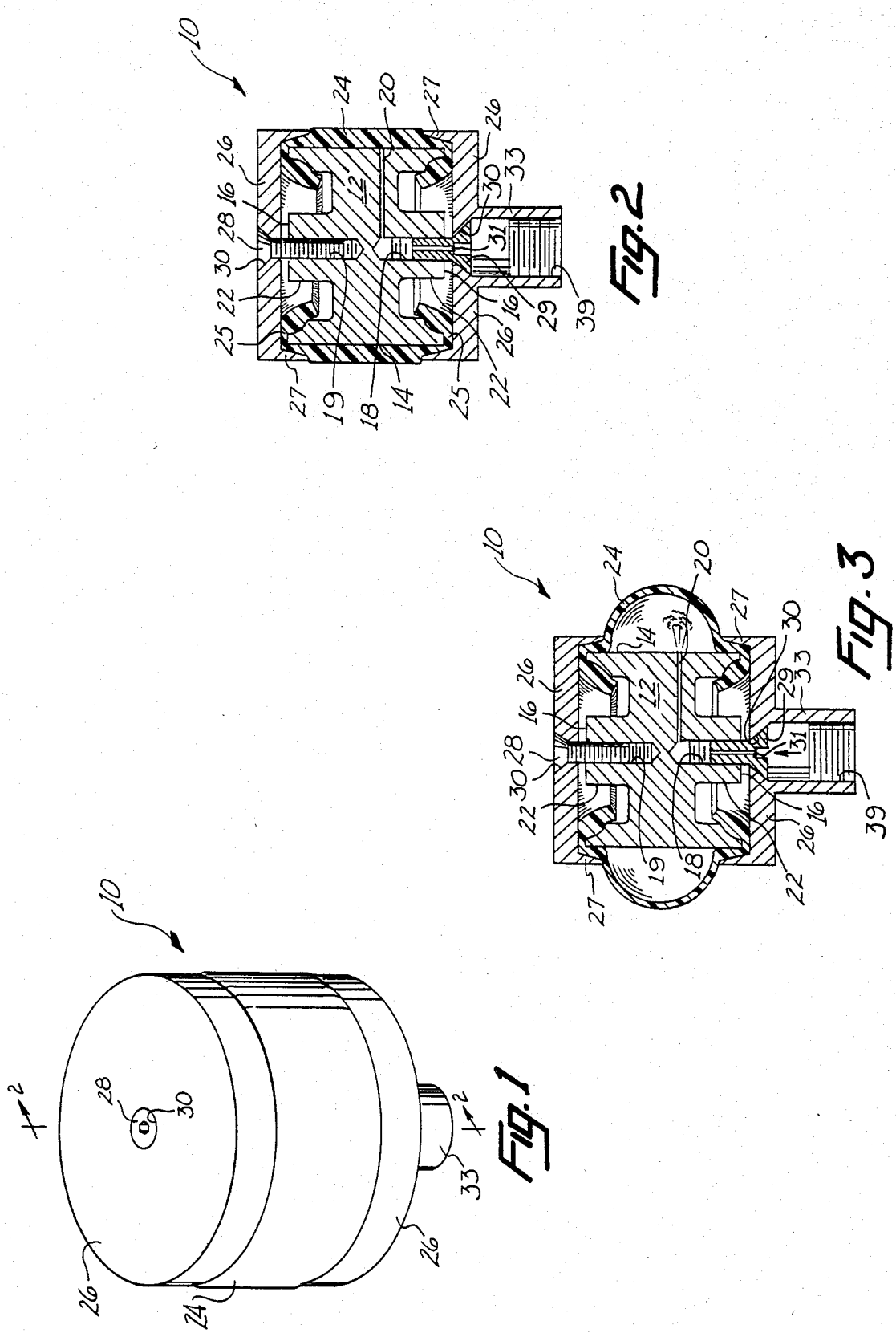

__4,506,706__

EXPANSION BULB FOR PLUGGING A CONDUIT OR PASSAGE

SUMMARY OF THE INVENTION

This invention relates to an expansion bulb.

An expansion bulb is used to plug a conduit or passage. There are many applications of such usage, such as checks of pressure leakage of airplane heaters, automobile radiators, and plumbing.

Desired characteristics of such expansion bulbs are a capability to expand to a great degree radially with small longitudinal expansion and a large expanded-to-unexpanded radius ratio for ease of placement of the expansion bulb in a conduit or passage.

The expansion bulb of this invention has such characteristics and includes a rigid body enveloped by an expandable sleeve. The sleeve is secured to the body at its ends by caps secured to the body by threaded fasteners. A passage in a cap communicates with a passage in the body for introducing pressurized air, or fluid, into the expandable sleeve. The caps substantially prevent longitudinal expansion and displacement of the sleeve, thereby providing substantial radial expansion of the sleeve, and maximum continuous circumferential sealing contact of the sleeve with the conduit or passage to be plugged whose internal dimension may be substantially larger than the unexpanded size of the device and whose shape may be irregular.

It is an object of this invention to provide an expansion bulb for plugging a conduit or passage which bulb expands radially with substantially no longitudinal expansion.

Another object is to provide an expansion bulb which has a high expanded-to-unexpanded radius ratio.

Another object is to provide an expansion bulb which can be made small enough to permit easy insertion and maneuverability thereof within a conduit or passage and which will expand sufficiently to form an air-tight circumferentially continuous seal in the conduit or passage.

Other objects of this invention will become apparent upon a further reading of the specification.

BRIEF DESCRIPTIONS OF THE DRAWINGS

FIG. 1 is a perspective view of the expansion bulb of this invention.

FIG. 2 is a longitudinal sectional view taken along line 2—2 of FIG. 1 showing the bulb in its unexpanded position.

FIG. 3 is a longitudinal sectional view similar to FIG. 2 showing the bulb in its expanded position.

DESCRIPTION OF THE PREFERRED EMBODIMENTS

Figure 4:
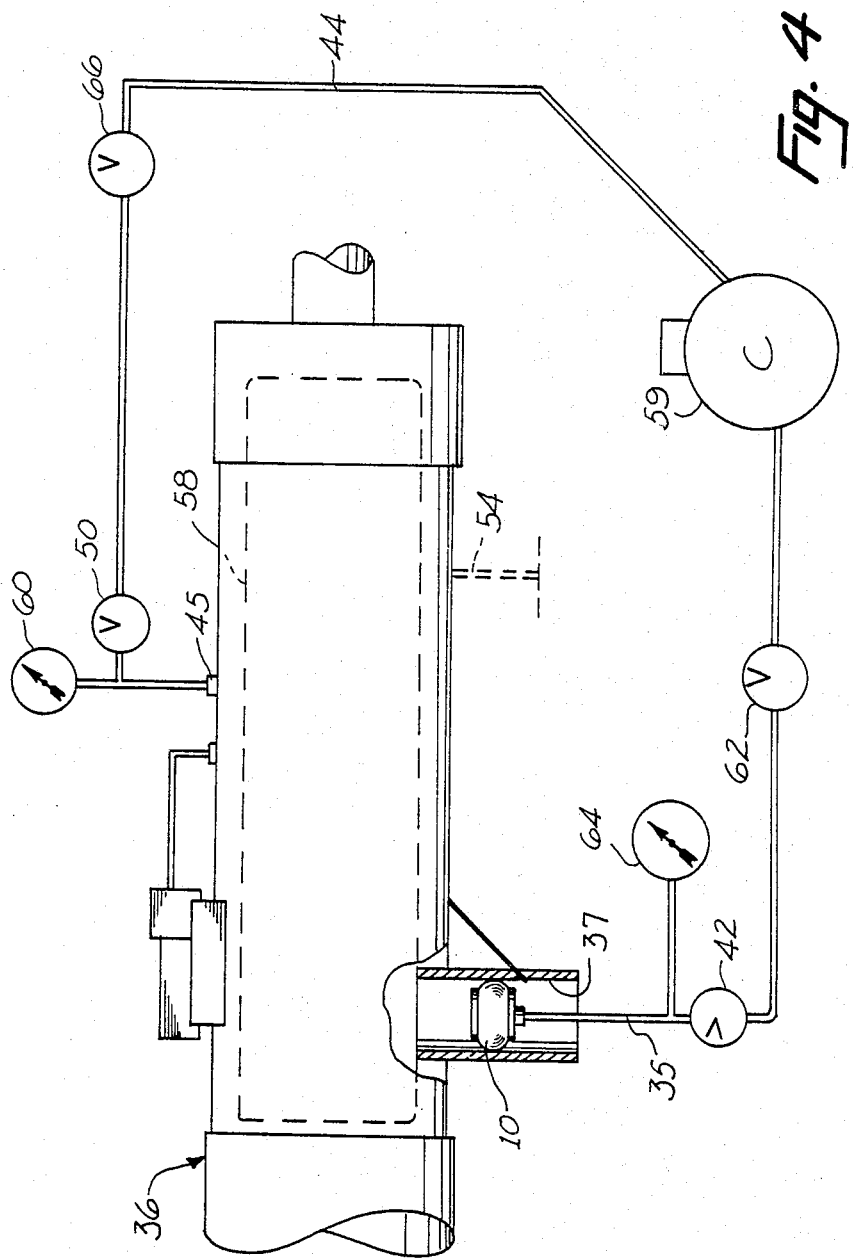
FIG. 4 is a diagram illustrating one use of the expansion bulb.

The preferred embodiment illustrated is not intended to be exhaustive or to limit the invention to the precise form disclosed. It is chosen and described to explain the principles of the invention and its application and practical use to thereby enable others skilled in the art to utilize the invention.

The expansion bulb 10 of this invention includes a body 12 preferably formed of metal or other rigid material and preferably having an overall cylindrical shape. Body 12 has a cylindrical surface 14, central cylindrical end portions 16, and an annular recess 22 about each central cylindrical portion 16. Threaded bores 18, 19 extend into opposite portions 16 of body 12. A passageway 20 is formed in body 12 which extends from the inner end of threaded bore 18 and is open at the outer surface 14. Portions 16 are defined by the annular recesses 22.

A sleeve 24 fits over body 12 and is preferably formed of an expandable resilient material, such as gum rubber or artificial rubber. The ends of sleeve 24 are folded around opposite ends of cylindrical body portion 14 at 25 and are received in the adjacent annular circumferential recess 22.

Rigid caps 26 are secured to opposite ends of body 12, as by threaded fasteners 28,29, such as screws, each of which passes through an opening 30 in the cap. Each cap 26 is of larger circumferential dimension than body 12 and has a circumferential flange 27 whose inner diameter has clearance with body 12 sufficient to fit around sleeve 24. Tightening of fasteners 28, 29 causes caps 26 to continuously circumferentially compress the adjacent infolded end portion 25 of the sleeve. This compression of sleeve 24 at 25 causes the sleeve to swell at its ends within the annular recesses 22 to prevent sleeve 24 from release from body 12. Fastener 29 has a passage 31 extending endwise therethrough. Cap 26 secured to body 12 by fastener 29 has a tubular projection 33 having a threaded bore 39 formed therein to receive a fitting 34 mounted on the end of air or fluid supply hose 35.

One use of expansion bulb 10 is illustrated in FIG. 4 by way of example. In this use, expansion bulb 10 is used to plug an exhaust conduit or passage 37 of an aircraft heater 36 during a pressure decay test. For this test, an air or fluid supply hose 35 mounting expansion bulb unit 10 is connected to an air or fluid supply, such as an air compressor 59. A regulator 62 and a shutoff valve 42 are positioned in hose 35. A pressure gauge 64 is connected in hose 35 between expansion bulb 10 and shutoff valve 42 to indicate the pressure within the expansion bulb. A second air supply hose 44 is connected to compressor 59 and has interposed therein a regulator 66 and a shutoff valve 50. A pressure gauge 60 is connected in hose 44 between shutoff valve 50 and the chamber 58 of heater 36 for monitoring the pressure within the chamber. Hose 44 is connected to an inlet fitting 45 of the chamber 58 of heater 36. Hose 35 is supplied with air under pressure for introduction into bulb 10 to expand it within conduit 37 of heater 36 and hose 44 is supplied with air under pressure which is introduced into chamber 58 of heater 36. The test permits the detection of air leaks from heater chamber 58 when all outlets from the heater, such as exhaust 37 and drain 54, have been plugged, and the heater is charged with compressed air supplied by hose 44 to a predetermined pressure level and valve 50 is closed. Air pressure in chamber 58 is monitored for a period of time by observing pressure gauge 60 which responds to the pressure in heater chamber 58. It should be understood that expansion bulb 10 is amenable to a variety of other uses and may be pressurized with any type of fluid.

It is to be understood that this invention is not to be limited by the terms of the above description but may be modified within the scope of the appended claims.

I claim:

1. An expansion bulb for plugging a conduit or passage comprising a cylindrical rigid body having opposite ends, said body including a substantially concentric annular recess formed in each end of said body and a circular rib surrounding each recess, a continuous annular sleeve formed of expandable material circumscribing said body, said sleeve including integral inturned end portions surrounding said ribs and fitted continuously into said body recesses, and a rigid cap circumscribing said body at each rib, said cap overlying and pressing the adjacent inturned end of said sleeve to circumferentially compress and secure the sleeve end within each said recess, said body and a said cap including a bore in communication with a source of pressurized fluid, said bore extending through a said cap and said body to said sleeve from said source of pressurized fluid to cause expansion of said sleeve outwardly of said body.

2. The expansion bulb of claim 1, wherein one cap has an internally threaded tubular projection and one end of said bore terminates within said tubular projection.

3. The expansion bulb of claim 1 wherein each cap is of a greater diameter than said body and includes a marginal circumferential flange encircling said body adjacent, said sleeve inturned portion.

4. The expansion bulb of claim 1, and threaded means fastening each cap to said body, one cap having an internally threaded tubular projection encircling one fastening means, said one fastening means having a passage therethrough defining one end portion of said bore.

5. The expansion bulb of claim 1, wherein said caps compress said sleeve end portions against a surface forming a side wall of each of said annular recesses to cause swelling of each inturned end of said sleeve within an annular recess.

* * * * *